(12) United States Patent
Bouzaraa et al.

(10) Patent No.: US 10,291,823 B2
(45) Date of Patent: May 14, 2019

(54) APPARATUS AND METHOD FOR COLOR CALIBRATION

(71) Applicant: Huawei Technologies Co., Ltd., Shenzhen (CN)

(72) Inventors: Fahd Bouzaraa, Munich (DE); Onay Urfalioglu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 15/782,615

(22) Filed: Oct. 12, 2017

(65) Prior Publication Data
US 2018/0054548 A1    Feb. 22, 2018

Related U.S. Application Data

(63) Continuation of application No. PCT/EP2015/061407, filed on May 22, 2015.

(51) Int. Cl.
| | |
|---|---|
| *H04N 1/60* | (2006.01) |
| *G06T 5/00* | (2006.01) |
| *G06T 5/40* | (2006.01) |
| *H04N 1/387* | (2006.01) |
| *H04N 1/407* | (2006.01) |

(Continued)

(52) U.S. Cl.
CPC .......... *H04N 1/6027* (2013.01); *G06T 5/009* (2013.01); *G06T 5/40* (2013.01); *G06T 7/143* (2017.01); *G06T 7/40* (2013.01); *H04N 1/3871* (2013.01); *H04N 1/409* (2013.01);

*H04N 1/4074* (2013.01); *G06T 7/90* (2017.01); *G06T 2207/20208* (2013.01); *H04N 1/4092* (2013.01)

(58) Field of Classification Search
CPC .. H04N 1/6027; H04N 1/3871; H04N 1/4074; H04N 1/409; H04N 1/4092; G06T 7/143; G06T 5/009; G06T 5/40; G06T 7/40; G06T 7/90; G06T 2207/20208
See application file for complete search history.

(56) References Cited

U.S. PATENT DOCUMENTS

| 8,842,911 B2 * | 9/2014 | Pettigrew ................. H04N 1/60 |
| | | 382/162 |
| 9,189,859 B2 * | 11/2015 | Vogiatis ............... H04N 13/221 |

(Continued)

FOREIGN PATENT DOCUMENTS

| JP | 2010016803 A | 1/2010 |
| JP | 2012203852 A | 10/2012 |

(Continued)

OTHER PUBLICATIONS

Machine Translation and Abstract of Japanese Publication No. JP2013110701, Jun. 6, 2013, 45 pages.

(Continued)

*Primary Examiner* — Gregory M Desire
(74) *Attorney, Agent, or Firm* — Conley Rose, P.C.

(57) ABSTRACT

An apparatus and a method for mapping colors of a source image to colors of a reference image, where the apparatus is configured to match a histogram of the source image to a histogram of the reference image to generate a histogram matched image of the source image, generate a conditional probability distribution of the reference image, and detect outliers in the histogram matched image based on the conditional probability distribution.

19 Claims, 5 Drawing Sheets

(51) Int. Cl.
*H04N 1/409* (2006.01)
*G06T 7/143* (2017.01)
*G06T 7/40* (2017.01)
*G06T 7/90* (2017.01)

(56) References Cited

U.S. PATENT DOCUMENTS

| | | | | |
|---|---|---|---|---|
| 9,324,138 | B2* | 4/2016 | Olsen | G06T 5/009 |
| 9,349,162 | B1* | 5/2016 | Chen | H04N 1/6058 |
| 2005/0088534 | A1 | 4/2005 | Shen et al. | |
| 2008/0069427 | A1* | 3/2008 | Liu | G06K 9/34 |
| | | | | 382/137 |
| 2010/0183071 | A1 | 7/2010 | Segall et al. | |
| 2014/0108401 | A1* | 4/2014 | Namazifar | G06F 17/30312 |
| | | | | 707/736 |
| 2015/0269739 | A1* | 9/2015 | Ho | G06T 7/194 |
| | | | | 382/164 |
| 2015/0278224 | A1* | 10/2015 | Jaber | G06F 17/30259 |
| | | | | 707/749 |
| 2016/0253466 | A1* | 9/2016 | Agaian | G06N 3/0427 |
| | | | | 382/128 |
| 2018/0054548 | A1* | 2/2018 | Bouzaraa | G06T 5/009 |

FOREIGN PATENT DOCUMENTS

| | | | |
|---|---|---|---|
| JP | 2013110701 | A | 6/2013 |
| KR | 101373471 | B1 | 3/2014 |

OTHER PUBLICATIONS

Rosenthal, J., et al., "Preserving dynamic range by advanced color histogram matching in stereo vision," International Conference on 3D Imaging (IC3D), 2012, 7 pages.
Foreign Communication From a Counterpart Application, Japanese Application No. 2017-554010, Japanese Office Action dated Nov. 13, 2018, 4 pages.
Foreign Communication From a Counterpart Application, Japanese Application No. 2017-554010, English Translation of Japanese Office Action dated Nov. 13, 2018, 4 pages.
Machine Translation and Abstract of Japanese Publication No. 2010016803, Jan. 21, 2010, 16 pages.
Foreign Communication From a Counterpart Application, Korean Application No. 10-2017-7026637, Korean Office Action and Translation dated Jul. 17, 2018, 7 pages.
Canny, J., "A Computational Approach to Edge Detection," IEEE Transactions on Pattern Analysis and Machine Intelligence, vol. PAMI-8, No. 6, Nov. 1986, pp. 679-698.
Gonzalez, R., et al., "Digital Image Processing," Third Edition, New Jersey: Prentice Hall, 2006, 122 pages.
Mertens T., et al., "Exposure Fusion," XP031338475, 15th Pacific Conference on Computer Graphics and Applications, Oct. 29, 2007, pp. 382-390.
Rolland, J., et al., "Fast Algorithms for Histogram Matching: Applications to Texture Synthesis," Journal of Electronic Imaging, vol. 9, No. 1, 2000, pp. 39-45.
Shapira, D., et al., "Multiple Histogram Matching," IEEE International Conference on Image Processing, 2013, pp. 2269-2273.
Fecker, U., et al., "Histogram—Based Prefiltering for Luminance and Chrominance Compensation of Multiview Video," XP011227822, IEEE Transactions on Circuits and Systems for Video Technology, vol. 18, No. 9, Sep. 1, 2008, pp. 1258-1267.
Mertens, T., et al., "Exposure Fusion," 15th Pacific Conference on Computer Graphics and Applications, 2007, pp. 382-390.
Bouzaraa, F, et al., "A Naive Bayes Approach to Improve Histogram Matching Quality," XP032808420, IEEE 25th International Workshop on Machine Learning for Signal Processing, Sep. 17, 2015, 6 pages.
Wegener, M., "Destriping Multiple Sensor Imagery by Improved Histogram Matching," XP055243606, International Journal of Remote Sensing, vol. 11, No. 5, May 1, 1990, pp. 859-875.
Foreign Communication From a Counterpart Application, PCT Application No. PCT/EP2015/061407, International Search Report dated Feb. 3, 2016, 8 pages.
Foreign Communication From a Counterpart Application, PCT Application No. PCT/EP2015/061407, Written Opinion dated Feb. 3, 2016, 8 pages.
Machine Translation and Abstract of Japanese Publication No. JP2012203852, Oct. 22, 2012, 80 pages.
Machine Translation and Abstract of Korean Publication No. KR101373471, Mar. 13, 2014, 11 pages.
Foreign Communication From a Counterpart Application, Korean Application No. 2017-7026637, Korean Notice of Allowance dated Jan. 7, 2019, 2 pages.
Foreign Communication From a Counterpart Application, Korean Application No. 2017-7026637, English Translation of Korean Notice of Allowance dated Jan. 7, 2019, 2 pages.

* cited by examiner

Blue Channel  Green Channel  Red Channel

APPARATUS AND METHOD FOR COLOR CALIBRATION

CROSS-REFERENCE TO RELATED APPLICATION

This application is a continuation of International Patent Application No. PCT/EP2015/061407 filed on May 22, 2015, which is hereby incorporated by reference in its entirety.

TECHNICAL FIELD

The present application relates to an apparatus for color calibration, and further relates to an apparatus for mapping the colors of at least one source image to the colors of a reference image. The present application further relates to a method for mapping the colors of at least one source image to the colors of a reference image. Finally, the present application relates to a computer program having a program code for performing such a method, and to a use of such a method in imaging processing for example for high-dynamic-range imaging, background subtraction, or motion estimation.

BACKGROUND

In the field of imaging processing like in computer vision and in computational photography, it is desired to enhance the overall visual quality of a group of images. Such an enhancement can consist in improving the similarity between two images by performing a color calibration between two images that present color and possibly also content differences. Such a color calibration is also called color matching.

In other approaches, a color calibration is typically done by means of a histogram matching technique. The histogram matching technique consists in performing a color adjustment between two images presenting different exposures, in order to decrease the color discrepancy between the images. Histogram matching is known for example from "Digital Image Processing", Gonzalez and Woods, N.J. Prentice Hall, 2006. Histogram matching is a technique for color matching, wherein the histogram of a source image is matched to the histogram of a reference image.

Nevertheless, in case the source image and the reference image are not perfectly aligned due to camera or object motion, histogram matching can generate artifacts due to mismatches. The histogram matching image, i.e. the outcome image generated by the histogram matching operation, may also present artifacts due to mismatches in case of large exposure differences between the source and reference images. Furthermore, histogram matching typically involves brightening dark regions of the source image, which at the same time increases the level of image noise and further decreases the quality of the resulting image.

SUMMARY

In view of the above-mentioned disadvantages and problems, the present application aims to improve the state of the art. In particular, the object of the present application is to provide an apparatus and a method, respectively, which allow improving color calibration between two images.

The present application also intends to improve the quality of the histogram matching, particularly with respect to possible color artifacts and image noise comprised in the histogram matching outcome. The present application also intends to detect pixels presenting a histogram matching-related artifact or noise, such pixels being called outliers, and advantageously to correct the histogram matching outcome.

The above-mentioned object of the present application is achieved by the solution provided in the enclosed independent claims. Advantageous implementations of the present application are further defined in the respective dependent claims.

A first aspect of the present application provides an apparatus for mapping the colors of at least one source image to the colors of a reference image. The apparatus comprises a histogram matching unit adapted to match the histogram of the source image to the histogram of the reference image to generate a histogram matched image of the source image. The apparatus comprises a probability distribution computation unit adapted to generate a conditional probability distribution of the reference image. The apparatus further comprises an outlier detection unit adapted to detect outliers in the histogram matched image based on the conditional probability distribution.

Thereby, it is assumed that the conditional color distributions in the reference image, that is the combination of a central pixel and its neighbors, should be, for every pixel in the reference image, the same as in the histogram matched image. The conditional color distribution is also referred to as conditional probability distribution. The detection of probable outliers, i.e. of artifacts and noise due to mismatches, is based on checking whether the observed conditional color distributions in the histogram matched images are likely or not in the targeted color distribution of the reference image.

In a first implementation form of the apparatus according to the first aspect, the probability distribution computation unit is adapted to generate the conditional probability distribution by estimating a conditional probability of an intensity of a given pixel of the reference image given intensities of neighboring pixels of said given pixel, wherein the neighboring pixels are selected according to a neighborhood configuration.

Thereby, the targeted color distribution of the reference image can be determined such that the histogram matched image can be assessed with respect to the conditional probability distribution of the reference image to allow for a detection of outliers.

In a further implementation form of the apparatus according to the first aspect, the neighborhood configuration is adaptively selected according to the content of the source image and/or of the reference image.

Thereby, the conditional probability distribution is not fixed and can be adapted to the present source image that has to be calibrated with respect to the reference image. The quality of the outlier detection can also be increased by adapting the neighborhood configuration to the content of the present input images.

In a further implementation form of the apparatus according to the first aspect, the number of neighbors defined by the neighborhood configuration depends on the texture of the source image and/or of the reference image. Preferably the number of neighbors is increased for a source image and/or reference image with larger homogenous areas and/or with less textures.

Thereby, in case the source image and/or reference image have large homogeneous areas or few less texture, it is possible to increase the number of neighbors and to increase the overall size of the configuration such that the detection of outliers can be improved. Additionally, if the input images comprise rather more textures or only small homogeneous areas, the number of neighbors and the overall size of the configuration can be reduced, which leads also to a reduction of the computing time and effort for detecting the outliers within the histogram matched image.

In a further implementation form of the apparatus according to the first aspect, the outlier detection unit is adapted to detect a matched pixel of the histogram matched image as outlier if, based on the conditional probability distribution, the probability of a combination of the matched pixel and of its neighboring pixels, which are selected according to the neighborhood configuration, is lower than a threshold.

In a further implementation form of the apparatus according to the first aspect, the outlier detection unit is adapted to detect a matched pixel of the histogram matched image as outlier if, for the matched pixel and its neighboring pixels that are selected according to the neighborhood configuration, the conditional probability is lower than a threshold.

Thereby, the comparison of the probability of a given pixel combination with a threshold or the comparison of the conditional probability with a threshold provides for a convenient technique for automatically detecting that pixels are outliers.

In a further implementation form of the apparatus according to the first aspect, the threshold is predefined by a user or computed automatically. Preferably the threshold is comprised between 0.05 and 0.3.

Thereby, the quality of the outlier detection can be further adapted. A user can set the threshold to define the comparison threshold that best suits the needs. Further on, the threshold can be automatically adapted based on results achieved by prior experiments.

In a further implementation form of the apparatus according to the first aspect, the outlier detection unit is adapted to detect outliers in the histogram matched image for each color channel.

Thereby, outliers can be detected for source images with more than only one-color channel.

In a further implementation form of the apparatus according to the first aspect, the outlier detection unit is adapted to generate an outlier map identifying all outliers detected in the histogram matched image.

Thereby, the result of the outlier detection is summarized in the outlier map in a convenient way to allow a subsequent correction of the pixels, which are identified as outliers in the outlier map.

In a further implementation form of the apparatus according to the first aspect, the apparatus comprises an outlier correction unit adapted to correct outliers by correcting the intensity of the matched pixel, which is detected as outlier by the outlier detection unit, based on the conditional probability distribution.

Thereby, the outliers that are first detected in the histogram matched image can also be corrected to generate an improved histogram matched image with less artifacts and noise.

In a further implementation form of the apparatus according to the first aspect, the intensity of the matched pixel detected as outlier is corrected by finding the intensity that maximizes the conditional probability.

Thereby, the newly found intensity that maximizes the conditional probability will replace the previous intensity value within the histogram matched image. An improved histogram matched image is then created by this replacement.

In a further implementation form of the apparatus according to the first aspect, the outlier detection unit and the outlier correction unit are adapted to iterate several times the detection of outliers and the correction of outliers. The number of iterations is preferably increased if the amount of textures in the source image and/or of the reference image decreases.

Thereby, the iteration of the process allows for a further improvement of the quality of the histogram matched image. Moreover, the adaptation of the iteration number based on the content of the source image, like the texture, can avoid unnecessary iterations and save computation time and resources if the texture amount increases, and can improve the overall quality if the texture amount decreases.

In a further implementation form of the apparatus according to the first aspect, the apparatus comprises an edge detection unit adapted to detect edges of the reference image, detect edges of the histogram matched image, and generate a corresponding edge map of the reference image and a corresponding edge map of the histogram matched image. The probability distribution computation unit is adapted to generate the conditional probability distribution based on the edge map of the reference image. The outlier detection unit is adapted to detect outliers in the histogram matched image based on the edge map of the histogram matched image.

Edges indeed require special attention because they comprise large gradients, which could lead to a sparse support for the conditional distributions. Consequently, edges can be detected as outliers, i.e. erroneous pixels in the histogram matched image. Thereby, the edge detection can improve the outlier detection by excluding the edges from further processing, in that e.g. no estimation of the pixel color distribution is performed on the edges. The probability distribution computation unit can then be adapted to not take into consideration the edges of the edge map of the reference image for generating the conditional probability distribution, i.e. the edges detected on the reference image can then be excluded from the estimation of the conditional probability. The outlier detection unit can be adapted to not take into consideration the edges of the edge map of the histogram matched image for detecting outliers.

In a further implementation form of the apparatus according to the first aspect, the apparatus comprises a fusion operation unit. The edge detection unit is adapted to detect edges of the source image, and generate a corresponding edge map of the source image. The fusion operation unit is adapted to process the edge map of the histogram matched image by combining the edge map of the histogram matched image and the edge map of the source image.

Thereby, the edges detected on the source image can be considered and can improve the edge detection carried out for the histogram matched image. It is then possible to exclude from further processing also edges that were not detected on the histogram matched image.

In a further implementation form of the apparatus according to the first aspect, the apparatus comprises an exposedness assessment unit adapted to generate an exposedness map identifying, for each pixel position, if the pixel at this position is better exposed in the histogram matched image or in the source image. The fusion operation unit is adapted to process the edge map of the histogram matched image by combining the edge map of the histogram matched image and the edge map of the source image according to the exposedness map.

Thereby, the combination based on the exposedness allows for an efficient edge merging operation.

In a further implementation form of the apparatus according to the first aspect, the apparatus comprises an erosion operation unit adapted to apply an erosion on the edge map of the reference image and on the edge map of the histogram matched image.

Thereby, also pixels in the immediate vicinity of detected edges can be discarded from further processing.

In a further implementation form of the apparatus according to the first aspect, the erosion operation unit is adapted to apply the erosion according to an erosion kernel. The size of the erosion kernel depends on the neighborhood configuration, and particularly depends on the size or the depth of the neighborhood configuration.

Thereby, since the erosion depends on the neighborhood configuration, the erosion can prevent edge pixels from being part of the set of neighbor pixels and can prevent said edge pixels from being considered when detecting and correcting outliers.

A second aspect of the present application provides a method for mapping the colors of at least one source image to the colors of a reference image. The method comprises a histogram matching comprising matching the histogram of the source image to the histogram of the reference image to generate a histogram matched image of the source image. The method comprises a probability distribution computation generating a conditional probability distribution of the reference image. The method comprises an outlier detection comprising detecting outliers in the histogram matched image based on the conditional probability distribution.

The methods according to the second aspect of the application can be performed by the system according to the first aspect of the application. Further features or implementations of the method according to the second aspect of the application can perform the functionality of the apparatus according to the first aspect of the application and its different implementation forms.

A third aspect of the present application provides a computer program having a program code for performing this method, when the computer program runs on a computing device.

A fourth aspect of the present application is directed to the use of this method for high-dynamic-range imaging, background subtraction, or motion estimation.

It is noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present application will be explained in the following description of specific embodiments in relation to the enclosed drawings.

DETAILED DESCRIPTION OF EMBODIMENTS

Figure 1:
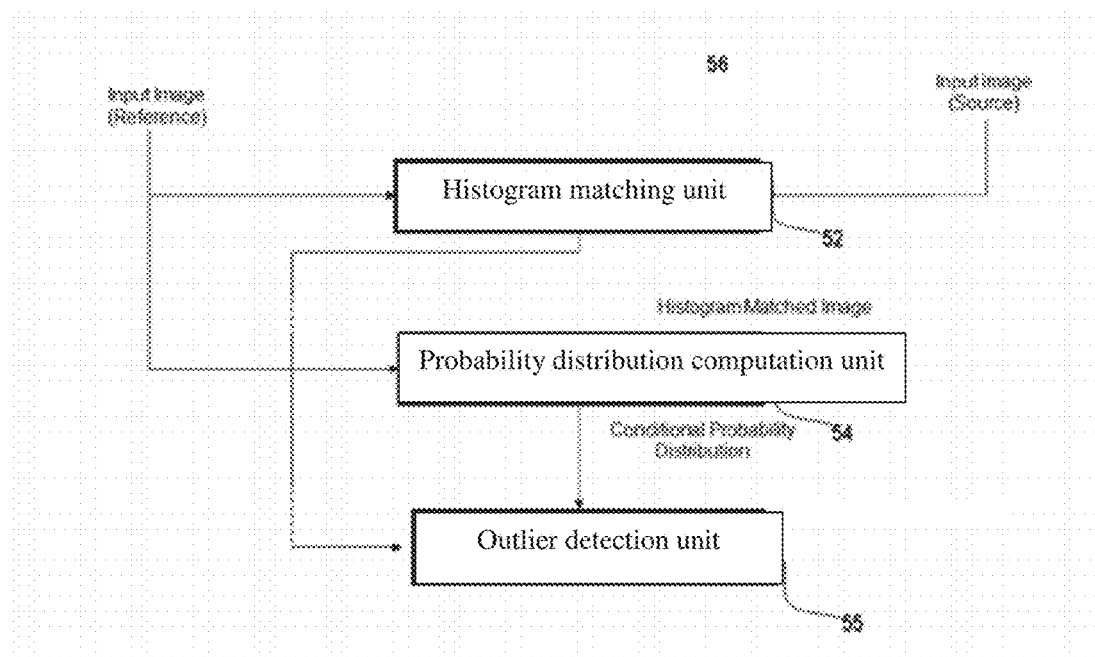
FIG. 1 shows an apparatus according to an embodiment of the present application.

FIG. 1 shows schematically an apparatus 56 according to an embodiment of the present application.

The apparatus 56 is adapted to map the colors of at least one source image to the colors of a reference image. In this context color mapping, color calibration or color matching, is the operation of mapping the colors of a source image to the colors of a reference image. The apparatus 56 comprises a histogram matching unit 52 adapted to match the histogram of the source image to the histogram of the reference image to generate a histogram matched image of the source image, a probability distribution computation unit 54 adapted to generate a conditional probability distribution of the reference image, and an outlier detection unit 55 adapted to detect outliers in the histogram matched image based on the conditional probability distribution.

The source image is an image whose color distribution or histogram will be mapped to a reference during a color mapping operation, and the reference image is an image whose color distribution or histogram will be used as a reference during a color mapping operation.

The histogram matching unit 52 is adapted to match the histogram of an input image being the source image to the histogram of an input image being the reference image to generate a histogram matched image of the source image. The histogram matching unit 52 shown in FIG. 1 comprises two inputs that are the source image and the reference image, and performs a histogram matching on the source image or a histogram matching based method on the source image. The output of the histogram matching unit 52 is a histogram matched image of the source image. The histogram matching unit 52 can alternatively comprise more than two inputs consisting in several source images and the reference image. In such a case, the histogram matching unit 52 also provides several outputs being respective histogram matched images of the source images.

The histogram matching performed by the histogram matching unit 52 comprises matching the histogram of the source image to the histogram of the reference image, i.e. matching the source histogram to the reference histogram. This matching output the histogram matched image of the source image, whose color properties are ideally close to those of the reference image.

The matching can comprise, as known in the art, the following steps to generate the histogram matched image.

At first, a respective histogram is generated from the source image and from the reference image, wherein a histogram consists in a graphical illustration of the distribution of the pixel color intensities of an image. Each of the two generated histograms is then normalized by dividing the histogram values by the total number of pixels in the respective image.

In a further step, the normalized histograms are processed to generate a respective cumulative distribution function (CDF) of both histograms of the source image and of the reference image, wherein a CDF describes the likelihood of a random variable X of having a probability distribution that is equal or greater than a specific value x according to the equation $F_X(x)=P(X \leq x)$. The two CDF may be respectively named $F_{source}()$ and $F_{reference}()$. The two CDF then operate as respective look-up tables. The indices of each look-up table correspond to the grey level values, and the content of each look-up table at a given index corresponds to the value of the CDF. For example, the grey level values range from 0 to 255.

In a further step, for each pixel of the source image having an associated grey level value of $I_{source}$, the look-up table of the source image is used to determine the corresponding value of the CDF of the source image. This CDF value is then searched and identified in the look-up table to determine the corresponding grey level value $I_{reference}$, in the reference image. At last, the grey level $I_{reference}$ is substituted for the grey level $I_{source}$ in the source image to generate the histogram matched image of the source image. Hence, the two CDF are used to match every pixel gray level $I_{source}$ in the source image in the range $\{0, 255\}$ to a new intensity $I_{reference}$ which satisfies the following equation:

$$F_{source}(I_{source}) = F_{reference}(I_{reference}).$$

The probability distribution computation unit 54 is adapted to generate a conditional probability distribution of the reference image. Preferably, the probability distribution computation unit 54 is adapted to generate the conditional probability distribution by estimating a conditional probability $p(I_c|I_{n1}, I_{n2}, I_{n3} \ldots I_{nN})$ of an intensity $I_c$ of a given pixel of the reference image given intensities $I_{n1}, I_{n2}, I_{n3} \ldots I_{nN}$ of neighboring pixels of said given pixel, wherein the neighboring pixels are selected according to a neighborhood configuration.

This means that the conditional probabilities used for modeling the color distribution of the reference image are computed. For a selected neighborhood configuration with N neighbors, for each neighbor, the conditional probability $p(I_c|I_{n1}, I_{n2}, I_{n3} \ldots I_{nN})$ is estimated. The values $I_c$ and $I_{n1}$ to $I_{nN}$ represent respectively the intensities of the central pixel of the neighborhood configuration and the N intensities of the remaining pixels of the neighborhood configuration.

The estimated conditional probability is based on the computed joint probabilities $p(I_c, I_{n1}, I_{n2}, I_{n3} \ldots I_{nN})$ and $p(I_{n1}, I_{n2}, I_{n3} \ldots I_{nN})$ from the reference image which contains the targeted color distribution, using a Bayesian framework according to the equation $p(a|b)=p(a, b)/p(b)$. Alternatively, an assumption can be made prior to the estimation of the conditional probability, in which the joint probabilities are assumed to be statistically independent.

Figure 2:
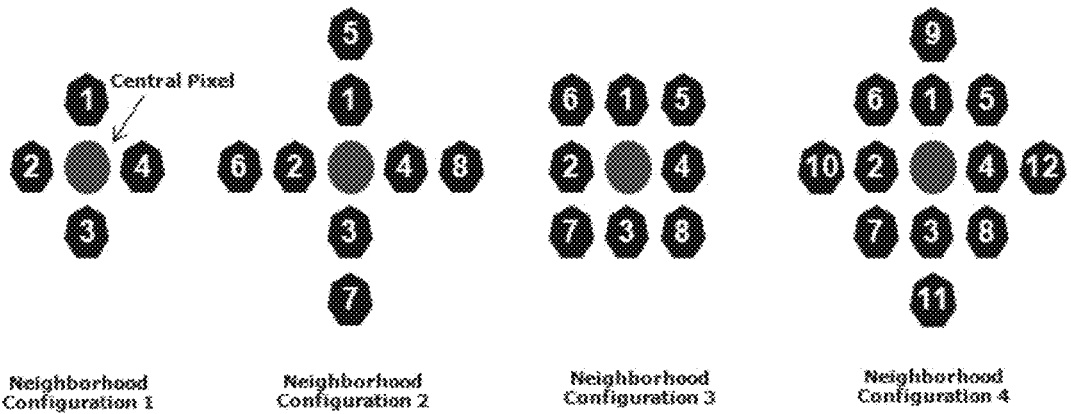
FIG. 2 shows examples of a neighborhood configuration according to an embodiment of the present application.

FIG. 2 shows examples of such a neighborhood configuration used by the probability distribution computation unit 54 and more generally by the apparatus 56, according to an embodiment of the present application.

According to a first example, the neighborhood configuration (i.e., Neighborhood Configuration 1) comprises the central pixel as well as the four pixels directly adjacent to the central pixel, i.e. the four pixels above 1, under 3, to the left 2 and to the right 4 of the central pixel. The second example (i.e., Neighborhood Configuration 2) of FIG. 2 shows a configuration comprising the central pixel and the two next pixels in each four directions, i.e. the two pixels 1, 5 above the central pixel, the two pixels 3, 7 under it, the two pixels 2, 6 to the left of it, and the two pixels 4, 8 to the right of it. The two pixels above the central pixel in fact correspond to the adjacent pixel located above the central pixel 1 as well as the adjacent pixel located above the latter. The third configuration (i.e., Neighborhood Configuration 3) comprises the central pixel and all eight pixels surrounding the central pixel, i.e. the four adjacent pixels 1, 2, 3, 4 and the four next pixels in diagonal direction 5, 6, 7, 8. The fourth configuration (i.e., Neighborhood Configuration 4) is a combination of the second and third configurations and correspondingly comprises, beside the central pixel, all neighbor pixel defined in these second and third configurations.

The neighborhood configuration used by the probability distribution computation unit 54 of the apparatus 56, is preferably adaptively selected according to the content of the source image and/or of the reference image. The choice of the neighborhood configuration can be adaptively set to fit the nature of the input images. The adaptive selection can be carried out depending on the source image or the reference image since both input images are supposed to comprise similar contents, or even depending on both input images.

The number of neighbors defined by the neighborhood configuration preferably depends on the texture of the source image and/or of the reference image. Preferably, the number of neighbors is increased for a source image and/or reference image with larger homogenous areas. Alternatively or in addition thereto, the number of neighbors is increased for a source image and/or reference image presenting less texture. For input images that are rich in textures, configurations with a smaller number of neighbors are more suitable, like in the first configuration of FIG. 2. On the other hand, configurations with a higher number of neighbors, like the fourth configuration of FIG. 2, better fit for images with large homogenous areas and less texture.

For the adaptive selection of the neighborhood configuration, the apparatus 56 can comprise a memory (not shown) adapted to store different neighborhood configurations like the configurations shown in FIG. 2. The apparatus 56 can further be adapted to quantify the amount of texture in the input images and select on the stored configurations depending on the quantified amount of texture. The quantification can for example be based on a statistical approach using edge detection.

With reference to FIG. 1, the outlier detection unit 55 is adapted to detect outliers in the histogram matched image based on the conditional probability distribution. The outlier detection unit 55 comprises two inputs being the histogram matched image generated by the histogram matching unit 52, and the conditional probability distribution generated by the probability distribution computation unit 54. An outlier is defined as being a pixel where a histogram matching-related artifact is detected.

The previously computed conditional probability distribution is used to detect histogram matching artifacts and noise, i.e. outliers. The underlying idea is to check, for each pixel inside the histogram matched image and according to the designated configuration, whether this combination of the central pixel intensity and its neighbors is likely or not.

Preferably, the outlier detection unit 55 is adapted to detect a matched pixel of the histogram matched image as outlier if, based on the conditional probability distribution, the probability of a combination of the matched pixel and of its neighboring pixels, which are selected according to the neighborhood configuration, is lower than a threshold T.

Preferably, the outlier detection unit 55 is adapted to detect a matched pixel of the histogram matched image as outlier if, for the matched pixel and its neighboring pixels that are selected according to the neighborhood configuration, the conditional probability $p(I_c|I_{n1}, I_{n2}, I_{n3} \ldots I_{nN})$ is lower than a threshold T. The neighborhood configuration is preferably the configuration already selected by the apparatus within the context of the probability distribution computation unit 54 for generating the conditional probability distribution.

Therefore, in the outlier detection unit 55, histogram matching outliers are detected given the previously estimated conditional probability distribution and the threshold T. The proposed approach checks whether the distribution of the pixel under consideration and its neighbors in the histogram matched image is likely or not if $p(I_c|I_{n1}, I_{n2}, I_{n3}, \ldots I_{nN}) > T$, it is likely that the pixel corresponds to a correct match, and if $p(I_c|I_{n1}, I_{n2}, I_{n3} \ldots I_{nN}) < T$, it is likely that the pixel is a miss-match, i.e. an outlier.

If the conditional probability is smaller than the threshold T, then it is assumed that the central pixel (pixel under consideration) is erroneous, thus considered to be an outlier.

The threshold T, which is preferably stored in the apparatus, can be predefined by a user or can be computed automatically. A user can for example send the value of the threshold T to the apparatus or store the value directly in the apparatus. The value of the threshold T can be computed based on prior experiments, i.e. empirically. For example, if in prior experiments the number of matched pixels detected as outliers is too high. i.e. if the number of detected outliers is too high with respect of the actual number of outliers, then the threshold T can be reduced to detect less outliers in the next color mapping operation. In the opposite case, the threshold T can be increased to detect more outliers in the next color mapping operation. The threshold T can be preferably set to a value being comprised between 0.05 and 0.3.

The outlier detection unit 55 is preferably adapted to detect outliers in the histogram matched image for each color channel. That is, outliers can be detected in the histogram matched image for the red channel, the green channel, and the blue channel. The detection is performed independently for each channel. The color channels, for which the outlier detection is carried out, depend on the chosen color model. In case the color mapping is based on the red, green, and blue (RGB) color model, outliers are detected within each of the red, green, and blue channels. For the alternative cyan, magenta, yellow, and black (CMYK) color model, outliers are detected within each of the four cyan, magenta, yellow, and black channels. In case the input images, i.e. the source image and the reference image, are grayscale images, only one channel is available and outliers are detected for only this channel.

The outlier detection unit 55 is preferably adapted to generate an outlier map identifying all outliers detected in the histogram matched image. The outlier map is preferably a binary outlier map, i.e. a map that indicates the locations or coordinates of the histogram matching outliers. The white pixels of the binary outlier map may indicate the location of probable histogram matching-related outliers, whereas the black pixels then indicate that have not been detected as outliers. Conversely, also the black pixels of the binary outlier map can indicate detected outliers.

If the outlier detection unit 55 is adapted to detect outliers in the histogram matched image for several color channels, like RGB channels, it is also adapted to generate several outlier maps. Preferably, one outlier map is then generated for each color channel.

Figure 3:
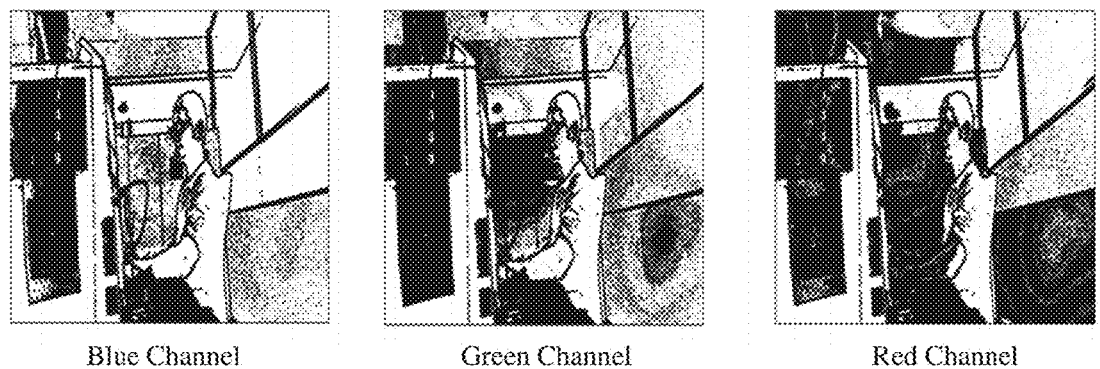
FIG. 3 shows outlier maps generated by an outlier detection unit according to an embodiment of the present application.

In this respect, FIG. 3 shows outlier maps generated by the outlier detection unit 55 according to an embodiment of the present application. The three shown outlier maps are binary outlier maps for the respective blue, green, and red channels, wherein white pixels indicate probable detected outliers.

Figure 4:
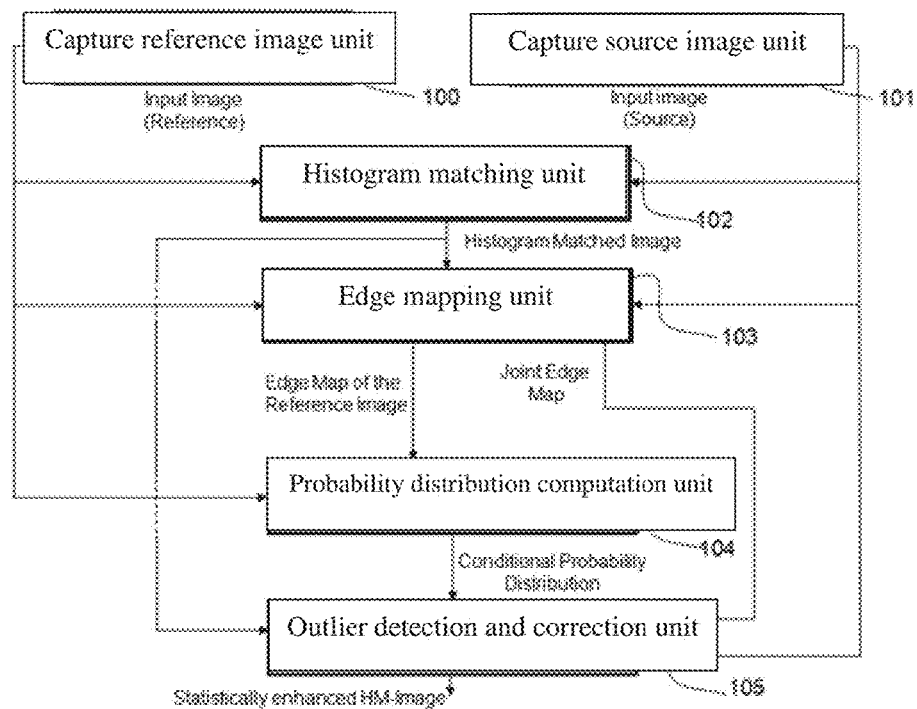
FIG. 4 shows an apparatus according to an embodiment of the present application.

FIG. 4 shows an apparatus 106 according to an embodiment of the present application. The apparatus 106 is adapted to map the colors of at least one source image to the colors of a reference image.

The apparatus 106 comprises a histogram matching unit 102 that is adapted to match the histogram of the source image to the histogram of the reference image to generate a histogram matched image of the source image, a probability distribution computation unit 104 that is adapted to generate a conditional probability distribution of the reference image, and an outlier detection and correction unit 105 that is adapted to detect outliers in the histogram matched image based on the conditional probability distribution. Preferably, the histogram matching unit 102, the probability distribution computation unit 104, and the outlier detection and correction unit 105 correspond to and comprise the features of respectively the histogram matching unit 52, the probability distribution computation unit 54, and the outlier detection unit 55 of the apparatus 56 shown in FIG. 1, and are adapted to carry out the same functions as the latter units 52, 54, 55. Additional features of these units of the apparatus 106 are detailed in the followings.

Preferably, the apparatus 106 further comprises a capture reference image unit 100 and a capture source image unit 101. These units 100, 101 are preferably cameras for capturing the reference image and the source image. In case a color mapping is performed for more than one source image, the apparatus 106 can comprise one or more additional capture source image units 101. Alternatively, the reference image and the source image can be captured by only one single capture image unit (not shown) that is then used to capture sequentially the reference image and the source image or vice versa. The output of such a single capture image unit 101 is connected to the histogram matching unit 102. Alternatively, and instead of comprising the capture reference image unit 100 and the capture source image unit 101, the apparatus 106 can comprise one or more interfaces (not shown) adapted to receive the reference image and the source image and transmit them to the histogram matching unit 102, wherein in such a case the reference image and the source image are captured outside of the apparatus 106.

Further on, the apparatus 106 preferably comprises an edge mapping unit 103. The edge mapping unit 103 is shown in more detail in FIG. 5.

Figure 5:
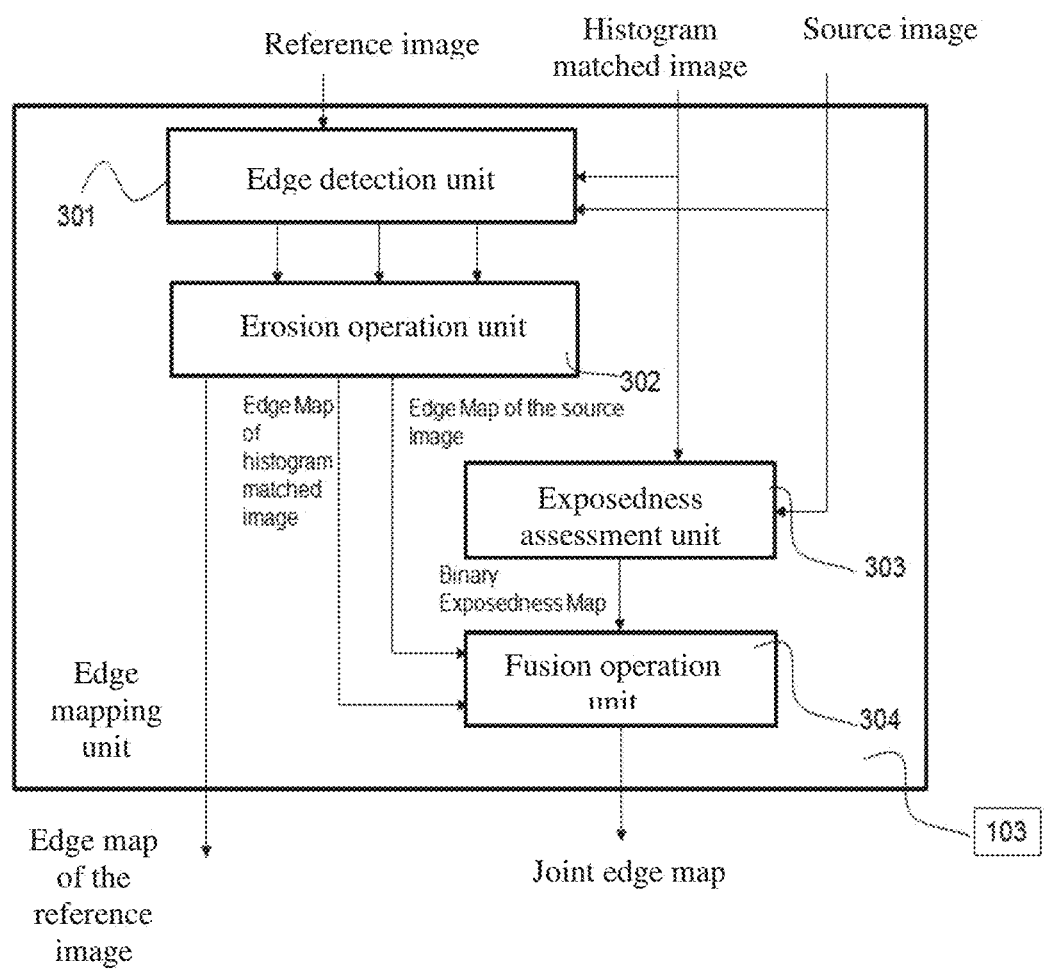
FIG. 5 shows an edge mapping unit according to an embodiment of the present application.

As shown in FIG. 5, the edge mapping unit 103 comprises preferably an edge detection unit 301 that is adapted to detect edges of the reference image, detect edges of the histogram matched image, and generate a corresponding edge map of the reference image and a corresponding edge map of the histogram matched image. This means that the edge map of the reference image identifies all detected edges of the reference image, and the edge map of the histogram matched image identifies all detected edges of the histogram matched image. The edge detection unit 301 comprises a known edge detector like a Canny edge detector or a detector based on an alternative technique such as a differential edge detection.

Accordingly, the probability distribution computation unit 104 is adapted to generate the conditional probability distribution based on the reference image as well as based on the edge map of the reference image. This means that the edges detected in the reference image are not taken into consideration for generating the conditional probability distribution.

Similarly, the outlier detection and correction unit 105 is adapted to detect outliers in the histogram matched image based on the conditional probability distribution as well as based on the edge map of the histogram matched image. This means that the edges detected in the histogram matched image are not taken into consideration when detecting outliers.

As shown in FIG. 5, the edge mapping unit 103 preferably comprises an erosion operation unit 302 that is adapted to apply an erosion on the edge map of the reference image and on the edge map of the histogram matched image. Hence, the erosion operation unit 302 is adapted, firstly, to detect pixels in the vicinity of the edges that have already been detected in the reference image and in the histogram matched image and, secondly, to correct accordingly the edge map of the reference image and the edge map of the histogram matched image so that also the pixels detected in the vicinity of the edges are identified by the two edge maps. The erosion is a morphological image processing operation that, when applied on binary images, for example black and white images, removes pixels on the boundaries of objects. This implies an expansion of the boundaries and edges in general. In FIG. 5, the outputs of the edge detection unit 301 are correspondingly the inputs of the erosion operation unit 302.

Preferably, the erosion operation unit 302 is adapted to apply the erosion according to an erosion kernel, i.e. to detect pixels in the vicinity of the edges according to an erosion kernel. The size of the erosion kernel then can depend on the neighborhood configuration of the apparatus, and for example be the same as the size of the neighborhood configuration. The size of the erosion kernel can depend on the size or the depth of the neighborhood configuration. The depth can be defined as being the distance, within the neighborhood configuration, from the central pixel to the more distant pixel. For example, the first and third configurations shown in FIG. 2 present a depth of 2 because all pixels other than the central pixel are direct neighbors of the central pixel. The second and fourth configurations shown in FIG. 2 present a depth of 3 because, for example in the second configuration, the more distant pixels 5, 6, 7, 8 are separated from the central pixel by one further pixel.

As shown in FIG. 5, the edge mapping unit 103 further comprises preferably a fusion operation unit 304. The edge detection unit 301 is adapted to detect edges of the source image, and generate a corresponding edge map of the source image. The fusion operation unit 304 is adapted to process the edge map of the histogram matched image by combining the edge map of the histogram matched image and the edge map of the source image. The processed edge map of the histogram matched image is referred to as joint edge map in FIGS. 4 and 5. Optionally, the erosion operation unit 302 is adapted to apply the erosion on this generated edge map of the source image.

As shown in FIG. 5, the edge mapping unit 103 further comprises preferably an exposedness assessment unit 303 that is adapted to generate an exposedness map identifying, for each pixel position (x,y), if the pixel at this position (x,y) is better exposed in the histogram matched image or in the source image. The fusion operation unit 304 is adapted to process the edge map of the histogram matched image by combining the edge map of the histogram matched image and the edge map of the source image according to the exposedness map.

In this context, a pixel being better exposed than another pixel means a pixel presenting a better exposure than said another pixel, wherein the exposure describes the amount of light gathered by the capture unit. i.e. for example by the camera. A low-exposed image appears to be dark and a high-exposed image appears to be bright. The exposedness map allows for disregarding pixels being low-exposed or high-exposed and privileging pixels being better exposed.

The exposedness assessment unit 303 generates an exposedness map from the source image and the histogram matched image. The exposedness map is a binary map that indicates, for each pixel, the image where this pixel is best exposed. For example if the binary map has a value of 1, respectively 0, at a given pixel location (x,y), this indicates that the pixel defined by this location is better exposed in the source image, whereas a value of 0, respectively 1, indicates that the pixel is better exposed in the histogram matched image. The exposedness map can be generated according to the known exposure fusion method, which is e.g. described in "Exposure Fusion". Mertens, Kautz, and Van Reeth, Pacific Graphics, 2007, pp. 369-378.

As shown in FIG. 5, the fusion operation unit 304 comprises several inputs that are the edge map of the histogram matched image, the edge map of the source image, and preferably the exposedness map. The edge map of the histogram matched image is processed in that the fusion operation unit 304 adaptively merges the edge maps of the histogram matched image and the source image according to the exposedness map. The merging operation is based on the previously generated binary exposedness map, wherein the edge pixel having a higher exposedness value will be selected into the joint edge map, i.e. into the processed edge map of the histogram matched image. This allows for an efficient edge merging operation.

The selection of pixels having a higher exposedness allows for discarding e.g. pixels having an intensity near zero or near one, i.e. pixels being underexposed or overexposed. The exposedness can be calculated using a Gaussian weighting curve according to the following equation:

$$\exp\left(-\frac{(i-0.5)^2}{2\delta^2}\right).$$

As proposed in "Exposure Fusion". Mertens, Kautz. and Van Reeth, Pacific Graphics. 2007. pp. 369-378, the exposedness or well-exposedness can be obtained by weighting each pixel intensity based on how close it is to 0.5, wherein the value of $\delta$ in the above equation may be 0.2. For pixels having several intensities in several channels, the exposedness can be obtained by applying the Gaussian weighting curve on each channel and then adding or multiplying the obtained values of each channel.

Figure 6:
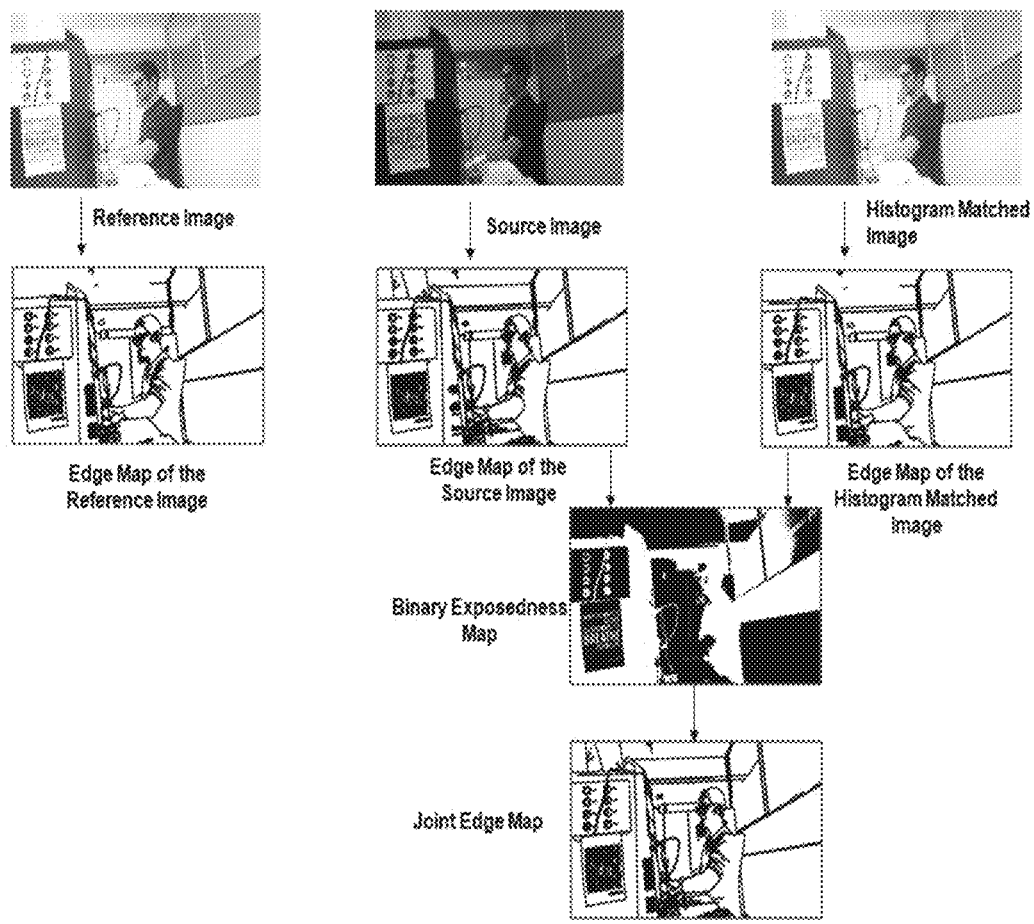
FIG. 6 shows input images of an edge mapping unit according to an embodiment of the present application as well as different maps generated by the edge mapping unit.

FIG. 6 shows input images of an edge mapping unit according to an embodiment of the present application as well as different maps generated by the edge mapping unit 103. Particularly, FIG. 6 shows examples of the different images and edge maps described above with respect to FIG. 5.

Figure 7:
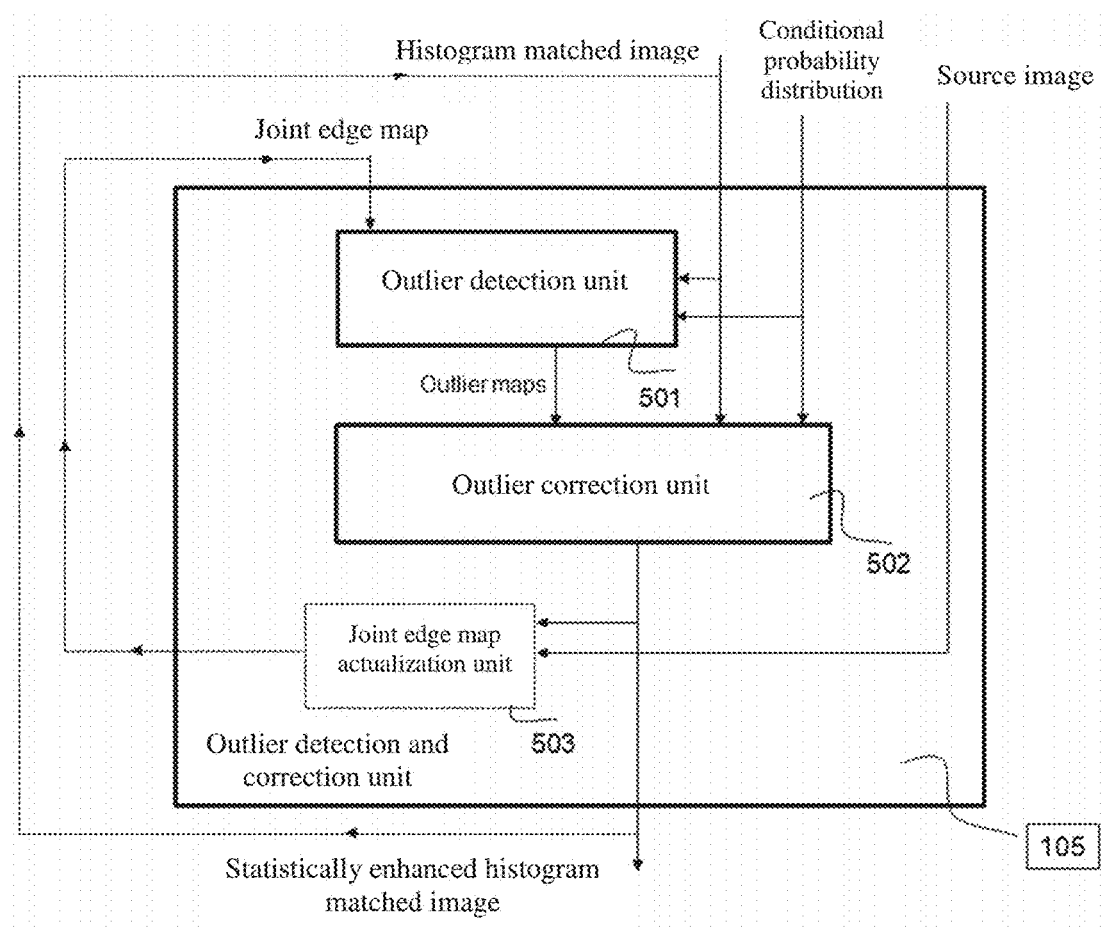
FIG. 7 shows an outlier detection and correction unit according to an embodiment of the present application.

FIG. 7 shows an outlier detection and correction unit 105 according to an embodiment of the present application. FIG. 7 is a detailed schematic view of the outlier detection and correction unit 105 of FIG. 4.

The outlier detection and correction unit 105 comprise an outlier detection unit 501 that corresponds to the outlier detection unit 55 of FIG. 1, and accordingly generates an outlier map. Preferably, the outlier detection and correction unit 105 as well as the outlier detection unit 55 generate one outlier map for each color channel.

The outlier detection unit 501 differs from the outlier detection unit 55 of FIG. 1 in that it comprises a further input for receiving the joint edge map generated by the edge mapping unit 103. As presented above, this joint edge map comprises the edge maps of the source and histogram matched images. The outlier detection unit 501 uses the joint edge map to exclude the positions, i.e. the edges, identified by this joint edge map from the detection of outliers. The outlier map—or the outlier maps for each channel—is generated by the outlier detection unit 501 taking this joint edge map into consideration.

An outlier correction unit 502 is provided in the outlier detection and correction unit 105 for correcting the outliers identified by the outlier map. The correction is performed by correcting the intensity of the matched pixels, which are detected as outliers by the outlier detection unit 501, based on the conditional probability distribution.

The intensity of a matched pixel detected as outlier is corrected by finding the intensity $I_c$ that maximizes the conditional probability $p(I_c|I_{n1}, I_{n2}, I_{n3} \ldots I_{nN})$. Thereby, the newly found intensity $I_{cNew}$ that maximizes the conditional probability will replace the previous intensity value within the histogram matched image.

Hence, having located all possible outliers separately for each color channel, the outlier correction unit 502 focuses on finding a replacement, thus correcting, the histogram matching-related outliers as indicated in the previously generated outlier maps. The underlying idea is to find a maximum a-posteriori estimation (MAP) estimate for the intensity of the central pixel using its neighbors. The MAP is a Bayesian estimation approach used to estimate the probability of an unobserved data based on the available empirical information. Here, the MAP estimate aims at finding the intensity $I_c$ which maximizes the conditional probability $p(I_c|I_{n1}, I_{n2}, I_{n3} \ldots I_{nN})$:

$$I_{cNew} = \arg\max \{p(I|I_{a1}, I_{n2}, I_{n3} \ldots I_{nN})\}; I \in \{0,255\}.$$

The output of the outlier correction unit 502 is then an improved version of the histogram matched image, labeled in FIG. 7 as statistically enhanced histogram matched image. The outlier detection unit 501 and the outlier correction unit 502 can be iterated several times to improve the performance of the proposed method. The iteration is shown in FIG. 7 in that the statistically enhanced histogram matched image is reused as input for both the outlier detection unit 501 and the outlier correction unit 502.

The number of iterations can be set automatically to better fit the requirements of the input images. For example, an increased number of iterations is beneficial in the case of texture-less images. Since iterations tend to blur the final results, the number of iteration shall be reduced for images with more textures. For determining the number of iterations, a value reflecting the amount of texture can be calculated by known technique, for example by computing the variance of the patch, by edge detection or by a gradient-based technique.

Optionally, in case the previously described detection and correction steps are iterated several times, the joint edge map can be updated in a joint edge map actualization unit 503. This update is done for example after each iteration of the detection and correction steps. The joint edge map actualization unit 503 comprises inputs being the source image and the statistically enhanced histogram matched image. These two input images are used by the joint edge map actualization unit 503 for generating an updated version of the joint edge map, in a similar way as the edge detection unit 301 generates the joint edge map based on the source image and the histogram matched image. This means that the joint edge map actualization unit 503 can similarly comprise an edge detection unit, an optional erosion operation unit, an exposedness assessment unit and a fusion operation unit (not shown) to generate the updated version of the joint edge map. This updated version is then fed back to the outlier detection unit 501 as shown in FIG. 7.

Further, this edge detection unit (not shown) can, similarly to the edge detection unit 301, detect edges of the statistically enhanced histogram matched image and of the source image, and generate a corresponding edge map of the statistically enhanced histogram matched image and a corresponding edge map of the source image. This optional erosion operation unit (not shown) can, similarly to the erosion operation unit 302, apply an erosion on these two edge maps. Further on, the exposedness assessment unit and the fusion operation unit (not shown) can then, similarly to the exposedness assessment unit 303 and the fusion operation unit 304, generate the updated version of the joint edge map.

The resulting histogram matched image that is output by the outlier detection and correction unit 105 comprises less noise and artifacts, therefore allowing for a better and accurate edge detection.

The present application has been described in conjunction with various embodiments as examples as well as implementations. However, other variations can be understood and effected by those persons skilled in the art and practicing the claimed application, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An apparatus for mapping colors of a source image to colors of a reference image, comprising:
   a memory comprising instructions; and
   a processor coupled to the memory, wherein the instructions cause the processor to be configured to:
      match a histogram of the source image to a histogram of the reference image to generate a histogram matched image of the source image;
      generate a conditional probability distribution of the reference image by estimating a conditional probability ($p(I_c|I_{n1}, I_{n2}, I_{n3} \ldots I_{nN})$) of an intensity ($I_c$) of a given pixel of the reference image given intensities ($I_{n1}, I_{n2}, I_{n3} \ldots I_{nN}$) of neighboring pixels of the given pixel, wherein the neighboring pixels are selected according to a neighborhood configuration; and
      detect outliers in the histogram matched image based on the conditional probability distribution.

2. The apparatus of claim 1, wherein the neighborhood configuration is adaptively selected according to the content of the source image or content of the reference image.

3. The apparatus of claim 2, wherein a number of neighbors defined by the neighborhood configuration depends on a texture of the source image and a texture of the reference image, and wherein the number of neighbors is increased for a source image and a reference image with larger homogenous areas or with less textures.

4. The apparatus of claim 2, herein a number of neighbors defined by the neighborhood configuration depends on a texture of the source image, and wherein the number of neighbors is increased for a source image with larger homogenous area or with less texture.

5. The apparatus of claim 2, wherein a number of neighbors defined by the neighborhood configuration depends on a texture of the reference image, and wherein the number of neighbors is increased for a reference image with larger homogenous area or with less texture.

6. The apparatus of claim 1, wherein the instructions further cause the processor to be configured to detect a matched pixel of the histogram matched image as outlier when, based on the conditional probability distribution, a probability of a combination of the matched pixel and of its neighboring pixels, which are selected according to the neighborhood configuration, is lower than a threshold (T).

7. The apparatus of claim 6, wherein the T is predefined by a user, and wherein the T is comprised between 0.05 and 0.3.

8. The apparatus of claim 6, wherein the instructions further cause the processor to be configured to correct the outliers by correcting an intensity of the matched pixel, which is detected as the outlier based on the conditional probability distribution.

9. The apparatus of claim 8, wherein the intensity of the matched pixel detected as the outlier is corrected by finding the $I_c$ that maximizes the $p(I_c|I_{n1}, I_{n2}, I_{n3} \ldots I_{nN})$.

10. The apparatus of claim 8, wherein the instructions further cause the processor to be configured to iterate several times the detection of the outliers and the correction of the outliers, and wherein the number of iterations is increased when amount of textures in the source image or of the reference image decreases.

11. The apparatus of claim 6, wherein the T is computed automatically, and wherein the T is comprised between 0.05 and 0.3.

12. The apparatus of claim 1, wherein the instructions further cause the processor to be configured to detect a matched pixel of the histogram matched image as outlier when, for the matched pixel and its neighboring pixels that are selected according to the neighborhood configuration, the $p(I_c|I_{n1}, I_{n2}, I_{n3} \ldots I_{nN})$ is lower than a threshold (T).

13. The apparatus of claim 1, wherein the instructions further cause the processor to be configured to detect the outliers in the histogram matched image for each color channel.

14. The apparatus of claim 1, wherein the instructions further cause the processor to be configured to generate an outlier map identifying all the outliers detected in the histogram matched image.

15. The apparatus of claim 1, wherein the instructions further cause the processor to be configured to:
detect edges of the histogram matched image;
generate a corresponding edge map of the reference image and a corresponding edge map of the histogram matched image;
generate the conditional probability distribution based on the edge map of the reference image; and
detect the outliers in the histogram matched image based on the edge map of the histogram matched image.

16. The apparatus of claim 15, wherein the instructions further cause the processor to be configured to:
detect edges of the source image;
generate a corresponding edge map of the source image; and
process the edge map of the histogram matched image by combining the edge map of the histogram matched image and the edge map of the source image.

17. The apparatus of claim 16, wherein the instructions further cause the processor to be configured to:
generate an exposedness map identifying, for each pixel position (x,y), when the pixel at this position (x,y) is better exposed in the histogram matched image or in the source image; and
process the edge map of the histogram matched image by combining the edge map of the histogram matched image and the edge map of the source image according to the exposedness map.

18. The apparatus of claim 15, wherein the instructions further cause the processor to be configured to apply an erosion on the edge map of the reference image and on the edge map of the histogram matched image.

19. A method for mapping colors of a source image to the colors of a reference image, comprising:
matching a histogram of the source image to a histogram of the reference image to generate a histogram matched image of the source image;
generating a conditional probability distribution of the reference image by estimating a conditional probability $(p(I_c|I_{n1}, I_{n2}, I_{n3} \ldots I_{nN}))$ of an intensity $(I_c)$ of a given pixel of the reference image given intensities $(I_{n1}, I_{n2}, I_{n3} \ldots I_{nN})$ of neighboring pixels of the given pixel, wherein the neighboring pixels are selected according to a neighborhood configuration; and
detecting outliers in the histogram matched image based on the conditional probability distribution.

* * * * *

UNITED STATES PATENT AND TRADEMARK OFFICE
CERTIFICATE OF CORRECTION

PATENT NO. : 10,291,823 B2
APPLICATION NO. : 15/782615
DATED : May 14, 2019
INVENTOR(S) : Fahd Bouzaraa et al.

Page 1 of 1

It is certified that error appears in the above-identified patent and that said Letters Patent is hereby corrected as shown below:

In the Claims

Column 15, Line 7: "herein" should read "wherein"

Column 16, Line 44: "($I_c$)of" should read "($I_c$) of"

Column 16, Line 46: "…$I_{nN}$)of" should read "…$I_{nN}$) of"

Signed and Sealed this
Twenty-third Day of July, 2019

Andrei Iancu
*Director of the United States Patent and Trademark Office*